US009740005B2

(12) United States Patent
Bean et al.

(10) Patent No.: US 9,740,005 B2
(45) Date of Patent: *Aug. 22, 2017

(54) SELECTIVELY PAIRING AN APPLICATION PRESENTED IN VIRTUAL SPACE WITH A PHYSICAL DISPLAY

(71) Applicant: INTERNATIONAL BUSINESS MACHINES CORPORATION, Armonk, NY (US)

(72) Inventors: Chris Bean, Chandler's Ford (GB); Sophie D. Green, Hursley (GB); Matthew R. Whitehead, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,704

(22) Filed: Aug. 19, 2015

(65) Prior Publication Data
US 2016/0180592 A1 Jun. 23, 2016

Related U.S. Application Data

(63) Continuation of application No. 14/579,714, filed on Dec. 22, 2014.

(51) Int. Cl.
*G06T 19/00* (2011.01)
*G02B 27/01* (2006.01)
(Continued)

(52) U.S. Cl.
CPC ............ *G02B 27/017* (2013.01); *G06F 3/011* (2013.01); *G06F 3/017* (2013.01); *G06F 3/0425* (2013.01);
(Continued)

(58) Field of Classification Search
CPC .. G06F 3/0481; G06F 3/04817; G06F 9/4443; G06F 3/04847; G06F 11/3664;
(Continued)

(56) References Cited

U.S. PATENT DOCUMENTS 8,046,719 B2 10/2011 Skourup et al.
8,912,979 B1 12/2014 Gomez
(Continued)

FOREIGN PATENT DOCUMENTS

| CN | 103635869 A | 3/2014 |
|---|---|---|
| CN | 103744638 | 4/2014 |
| WO | 2013095393 A1 | 6/2013 |

OTHER PUBLICATIONS

International Searching Authority, International Search Report and Written Opinion for International Application No. PCT/IB2015/059653, Mailed Apr. 6, 2016.
(Continued)

*Primary Examiner* — Todd Buttram
(74) *Attorney, Agent, or Firm* — Law Office of Jim Boice

(57) ABSTRACT

A method pairs content from a specific area in virtual space with a graphics driver for a physical display. An augmented reality device defines a virtual space, which is delimited by a spatial border that is created by the augmented reality device and is visible only to a user of the augmented reality device. One or more processors associate the virtual space with a graphics driver from a plurality of graphics drivers. A signal indicating a virtual space selection gesture is generated by the augmented reality device in response to the user making a physical motion that selects the virtual space, and sent to a video adapter hardware card. In response to receiving the signal indicating the virtual space selection gesture, the video adapter hardware card implements the
(Continued)

graphics driver to display content associated with the virtual space on the physical display.

14 Claims, 7 Drawing Sheets

(51) Int. Cl.
G06F 3/0484 (2013.01)
G06F 3/01 (2006.01)
G06F 3/0481 (2013.01)
G06F 3/042 (2006.01)

(52) U.S. Cl.
CPC ...... *G06F 3/04815* (2013.01); *G06F 3/04817* (2013.01); *G06F 3/04842* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ........ G06F 3/011; G06F 3/012; G06F 3/0304; G06T 19/00; G06T 17/00; G06T 19/006; H04N 5/272; A63F 13/10
See application file for complete search history.

(56) References Cited

U.S. PATENT DOCUMENTS

| 8,994,721 | B2* | 3/2015 | Matsuda | G06F 3/04815 345/419 |
|---|---|---|---|---|
| 2010/0064251 | A1 | 3/2010 | Hufnagel et al. | |
| 2011/0164163 | A1 | 7/2011 | Bilbrey et al. | |
| 2012/0223872 | A1 | 9/2012 | Ram | |
| 2012/0249443 | A1 | 10/2012 | Anderson et al. | |
| 2012/0326961 | A1 | 12/2012 | Bromer et al. | |
| 2013/0141421 | A1 | 6/2013 | Mount et al. | |
| 2013/0335405 | A1* | 12/2013 | Scavezze | G06T 19/20 345/419 |
| 2014/0035819 | A1 | 2/2014 | Griffin | |
| 2014/0098127 | A1 | 4/2014 | Fein | |
| 2014/0320394 | A1 | 10/2014 | Costanzo et al. | |
| 2015/0138261 | A1* | 5/2015 | Nakayama | G06F 1/3265 345/694 |
| 2015/0205106 | A1 | 7/2015 | Norden | |
| 2015/0234477 | A1 | 8/2015 | Abovitz | |
| 2015/0279332 | A1 | 10/2015 | Hu | |
| 2016/0026253 | A1* | 1/2016 | Bradski | G02B 27/225 345/8 |

OTHER PUBLICATIONS

H. Kaufmann et al., "Multiple Head Mounted Displays in Virtual and Augmented Reality Applications", The International Journal of Virtual Reality, 2007, vol. 6, No. 2, pp. 43-50.
Anonymous, "Independent Virtual Desktops on Multiple Monitors", Actual Tools, actualtools.com, retrieved Dec. 15, 2014, pp. 1-3.
Anonymous, "Xilisoft Multiple Desktops", Xilisoft Corporation, xilisoft.com, retrieved Dec. 15, 2014, pp. 1-3.
A. Penn et al., "Augmented Reality Meeting Table: a Novel Multi-User Interface for Architectural Design", DDSS 2004, pp. 1-19.
Meta Company, "META 1 Developer Kit", Meta Company, www.spaceglasses.com, retrieved Dec. 15, 2014, pp. 1-3.
Anonymous, "How to Obtain the Correct Physical Size of the Monitor?" Stack Overflow, stackoverflow.com, Feb. 23, 2009, retrieved Dec. 15, 2014, pp. 1-3.
List of IBM Patents or Patent Applications Treated As Related—Aug. 12, 2015, pp. 1-2.
U.S. Appl. No. 14/579,714 Non-Final Office Action Mailed Jun. 10, 2016.
U.S. Appl. No. 14/579,714 Final Office Action Mailed Dec. 22, 2016.

* cited by examiner

SELECTIVELY PAIRING AN APPLICATION PRESENTED IN VIRTUAL SPACE WITH A PHYSICAL DISPLAY

BACKGROUND

The present disclosure relates to the field of computers, and specifically to computer displays. Still more particularly, the present disclosure relates to populating a physical computer display with an application that is presented by augmented reality glasses in virtual space.

SUMMARY

In an embodiment of the present invention, a method pairs content from a specific area in virtual space with a graphics driver for a physical display. An augmented reality device defines a virtual space, where the virtual space is delimited by a spatial border that is created by the augmented reality device, and where the spatial border is visible only to a user of the augmented reality device. One or more processors associate the virtual space with a graphics driver from a plurality of graphics drivers, where the graphics drivers generate images on a physical display. A signal indicating a virtual space selection gesture is received from the augmented reality device, where the signal indicating the virtual space selection gesture is generated by the augmented reality device in response to the user making a physical motion that selects the virtual space. In response to receiving a signal indicating the virtual space selection gesture, a hardware graphics card implements the graphics driver to display content associated with the virtual space on the physical display.

In an embodiment of the present invention, a system pairs content from a specific area in virtual space with a graphics driver for a physical display. An augmented reality device defines a virtual space, where the virtual space is delimited by a spatial border that is created by the augmented reality device, and where the spatial border is visible only to a user of the augmented reality device. One or more processors associate the virtual space with a particular graphics driver from a plurality of graphics drivers, wherein the graphics drivers generate images on a physical display, where the one or more processors receive, from the augmented reality device, a signal indicating a virtual space selection gesture from the user of the augmented reality device, and where the signal indicating the virtual space selection gesture is generated by the augmented reality device in response to the user making a physical motion that selects the virtual space. A hardware graphics card, in response to receiving a signal indicating the virtual space selection gesture, implements the particular graphics driver to display content associated with the virtual space on the physical display.

In an embodiment of the present invention, a computer program product pairs content from a specific area in virtual space with a graphics driver for a physical display. The computer program product includes a computer readable storage medium having program code embodied therewith, and the computer readable storage medium is not a transitory signal per se. The program code is readable and executable by a processor to perform a method that includes defining a virtual space, where the virtual space is delimited by a spatial border that is created by an augmented reality device, and the spatial border is visible only to a user of the augmented reality device. The virtual space is associated with a particular graphics driver from a plurality of graphics drivers, where the graphics drivers generate images on a physical display. A signal indicating the virtual space selection gesture is received from augmented reality device, where the signal indicating the virtual space selection gesture is generated by the augmented reality device in response to the user making a physical motion that selects the virtual space. In response to receiving the signal indicating virtual space selection gesture, a hardware graphics card, implementing the particular graphics driver, displays content associated with the virtual space on the physical display.

DETAILED DESCRIPTION

Figure 1:
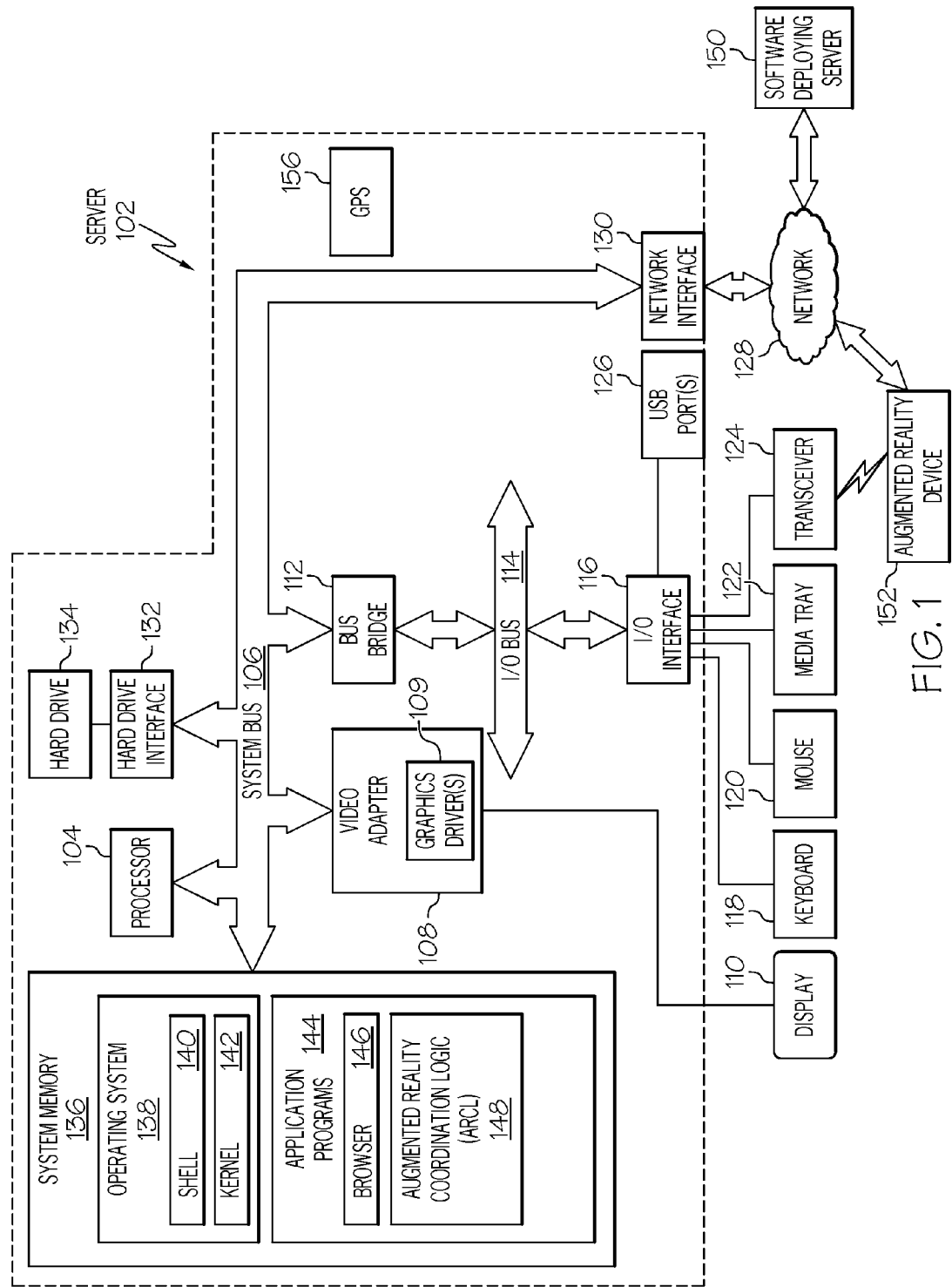
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or augmented reality device 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. In one or more embodiments of the present invention, video adapter 108 is a hardware video card. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a transceiver 124, and external USB port(s) 126. While the format of the ports connected to I/O interface 116 may be any known to those skilled in the art of computer architecture, in one embodiment some or all of these ports are universal serial bus (USB) ports.

Associated with (if not part of) the video adapter 108 is a graphics driver(s) 109. Graphics driver(s) 109, which in one embodiment is part of operating system 138, is software that controls how the video adapter 108 (e.g., a video card) generates text and images on the display 110. In an embodiment of the present invention, multiple graphics drivers 109 can be associated with the video adapter 108. In this embodiment, each of the multiple graphics drivers 109 are associated with a particular area of virtual space and/or with a particular application, as described below.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an augmented reality coordination logic (ARCL) 148. ARCL 148 includes code for implementing the processes described below, including those described in FIGS. 2-7. In one embodiment, computer 102 is able to download ARCL 148 from software deploying server 150, including in an on-demand basis, wherein the code in ARCL 148 is not downloaded until needed for execution. Note further that, in one embodiment of the present invention, software deploying server 150 performs all of the functions associated with the present invention (including execution of ARCL 148), thus freeing computer 102 from having to use its own internal computing resources to execute ARCL 148.

Transceiver 124 (and/or any input/output (I/O) interface such as USB port(s) 126) is able to electronically communicate with an augmented reality device 152, such as a pair of augmented reality (AR) glasses. AR glasses are a wearable electronic device that allows a wearer to see physical reality with an overlaid virtual reality (e.g., a heads-up display). Thus, the wearer/user is able to see both what is real (i.e., in real physical space) as well as what is virtual (i.e., generated by a computer and displayed on the heads-up display), thereby "augmenting" reality (that is real) with computer-generated images (which are virtual).

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
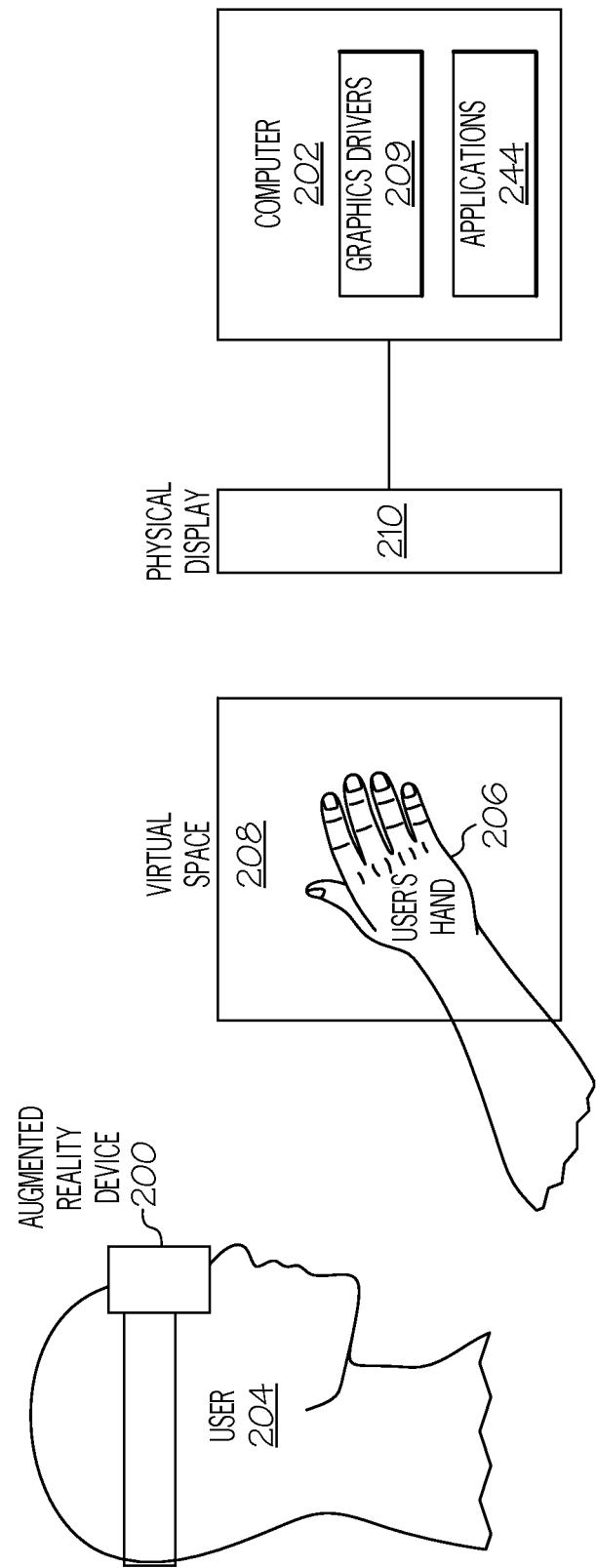
FIG. 2 illustrates an augmented reality device being used to selectively display virtual images on a physical display.

With reference now to FIG. 2, an augmented reality device 200 being used to selectively display virtual images on a physical display is presented. As shown in FIG. 2, a user 204 (e.g., the wearer of the augmented reality device 200) is able to "see" two types of images.

The first type of images seen by the user 204 are of real objects, which are viewed through a transparent portion of the augmented reality device 200. An example of such a real object is the physical display 210 (analogous to the display 110 in FIG. 1) and the content (e.g., application, webpage, etc.) being presented on the physical display by the computer 202 (analogous to the computer 102 in FIG. 1).

The second type of images seen by the user 204 are of virtual images, which are shown to the user on a display screen within the augmented reality device 200. As described herein, the virtual images may be overlaid onto the transparent portion of the augmented reality device 200 through which the user 204 sees the real world. Thus, these overlaid virtual images "augment" reality. Examples of virtual images visible to the user 204 include, but are not limited to, virtual application displays, virtual webpages, virtual video clips, etc., all of which are generated by the augmented reality device 200.

As shown in FIG. 2, within computer 202 are graphics drivers 209 (analogous to the graphics drivers 109 shown in FIG. 1). Graphics drivers 209 are defined as software units that generate images on a physical display (e.g., physical display 210). In an embodiment of the present invention, each of the graphics drivers 209 is associated with one, and only one, of the applications 244 (such as a spreadsheet, a video application, a word processing application, a browser, etc.). Furthermore and in one embodiment of the present invention, full versions of the applications 244 and their associated graphics drivers are not available to the augmented reality device 200. Rather, only a static descriptor image of the applications 244 is displayed on the augmented reality device 200. However, in another embodiment of the present invention, full versions of the applications 244 and their associated graphics drivers are available to the augmented reality device 200, such that real-time dynamic (changeable) content for the applications 244 is available for display on the augmented reality device 200.

Figure 3:
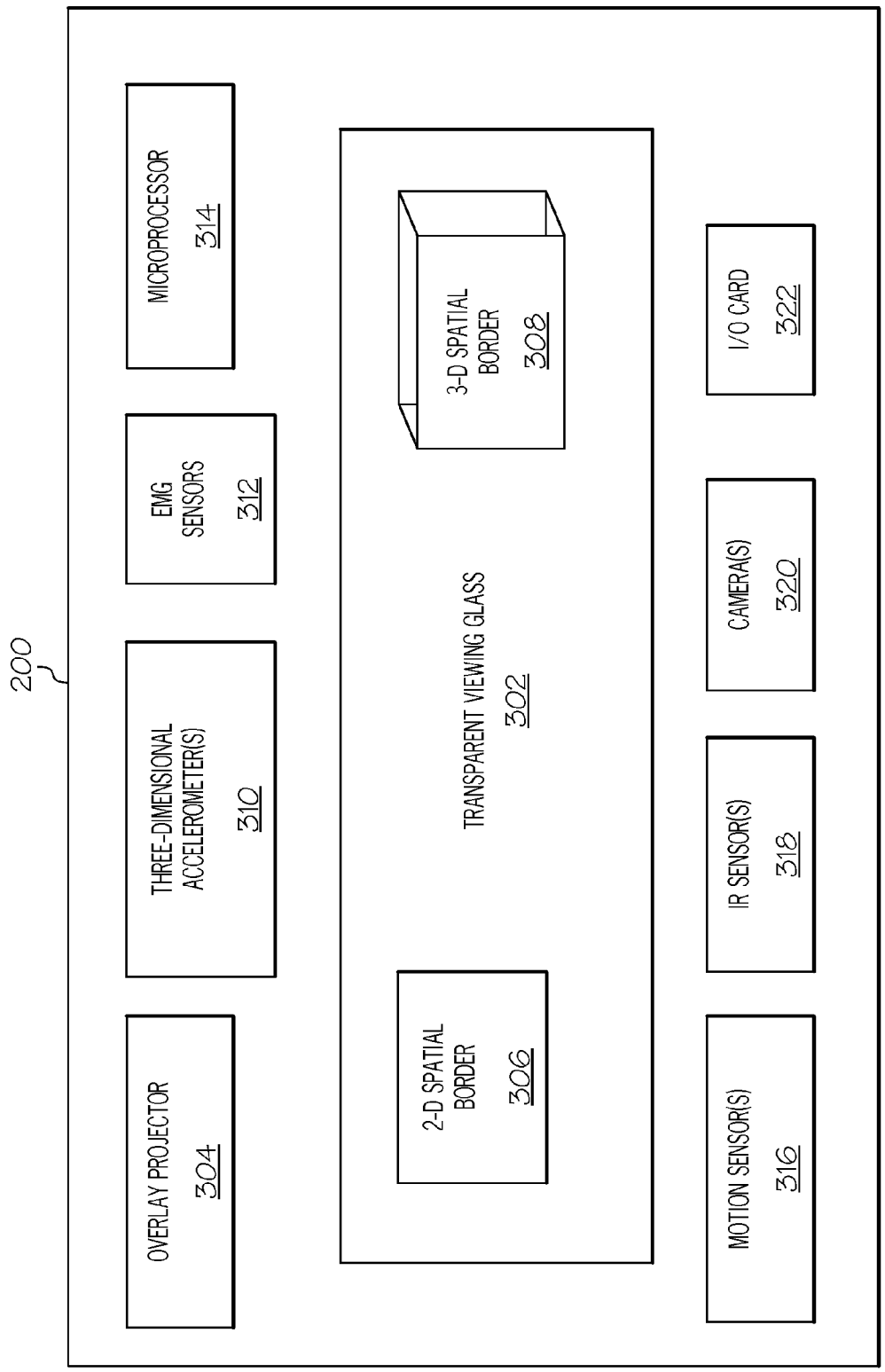
FIG. 3 depicts additional detail of the augmented reality device shown in FIG. 2.

With reference now to FIG. 3, additional detail of the augmented reality device 200 shown in FIG. 2 in accordance with one or more embodiments of the present invention is presented. As described above, augmented reality device 200 includes a transparent viewing glass 302, through which the wearer of the augmented reality device 200 is able to view the real (physical) world. However, in order to augment this view of the real world with virtual images, an overlay projector 304 is able to project images onto the transparent viewing glass 302, such that the user/viewer/wearer of the augmented reality device 200 sees both real physical objects from the world as well as the augmented virtual images. Thus, as shown in FIG. 2, the user 204 is able to see both the physical display 210 (and content from the applications 244 that is generated thereon) as well as virtual images, such as those in a virtual space 208.

Virtual space 208 may be two-dimensional or three-dimensional. For example and as shown in FIG. 3, a two-dimensional (2-D) spatial border 306 delimits only two dimensions. Therefore, when the user moves his hand 206 (as shown in FIG. 2) through space, any area in real space that is "behind" the 2-D spatial border 306 as viewed by the user 204 is considered by the system (e.g., computer 202) to be part of the virtual space 208 being selected by the user 204. However, when a user moves his hand 206 through the confined three-dimensional (3-D) space that is defined by 3-D spatial border 308, then the system only performs actions associated with that confined 3-D space. This 3-D feature allows various virtual spaces to occupy a same line of sight of the user 204, where one virtual space is in front of (or behind) another virtual space.

Thus, the 3-D spatial border 308 delimits a particular volume of real space as a virtual space. The user 204 "sees" the 3-D spatial border 308 "floating" in real space due to the optical illusion created by the image projected by the overlay project 304 onto the transparent viewing glass 302. When the user 204 moves his hand 206 (or any other object, such as a wand, a glove, a pointer, etc.) through the virtual space 208 created by the 3-D spatial border 308, then the computer 202 responds with an action that is associated with 1) the particular virtual space 208, and 2) the gesture/movement performed by the user's hand 206.

Returning to FIG. 3, the 3-D position of the augmented reality device 200 is needed to clarify/identify 1) where the user 204 is looking, and thus 2) which virtual space is being engaged with by the user 204.

In an embodiment of the present invention, the 3-D position of the augmented reality device 200 is established by 3-D accelerometers 310, which detect a 3-D movement of the augmented reality device 200. Various electronic devices can be used to detect acceleration movement in one or more axis, including piezoelectric, piezoresistive, and capacitive components that convert mechanical motion into electrical signals. In one embodiment the 3-D accelerometer(s) 310 incorporates the use of micro electro-mechanical systems (MEMS), which measure deflection of a micro-lever that is counter-weighted with a known mass.

In one embodiment of the present invention, the 3-D position of the augmented reality device 200 is determined by electromyographic (EMG) sensors 312 shown in FIG. 3. EMG sensors 312 are sensors that detect muscular movements by the user 204 shown in FIG. 2. That is, whenever a wearer of the augmented reality device 200 moves a muscle in his/her head, an electrical signal (i.e., an ion-induced change in electrical potential across the nerve membrane) is transmitted down axons (nerve fibers) that control the muscles. A motor neuron and the muscles that it innervates are collectively known as a motor unit. When the motor neuron causes the muscles in the motor unit to contract, electrical activity is stimulated in these muscles. The sum of the electrical activity from the motor neuron and the muscles in the motor unit create a motor unit action potential (MUAP), which is measured by the EMG sensors 312. The measured MUAP is analyzed by the processing logic (e.g., microprocessor 314 shown in FIG. 3) to identify the level of muscle movement. That is, electrical signals are specific enough to identify a location of which muscles are being moved. Whenever the wearer moves his head, a unique MUAP pattern occurs. Thus, the MUAP pattern detected in real time by the EMG sensors 312 is compared with known/stored MUAP readings for specific head positions. This comparison leads to a determination of where the augmented reality device 200 is in 3-D real space, and thus wherein the generated virtual space 208 is located.

In order to determine the location of the user's hand 206 shown in FIG. 2, various devices within the augmented reality device 200 can be used.

For example and in one embodiment of the present invention, motion sensors 316 detect movement of the user's hand 206 and the location of the user's hand 206. Motion sensors 316 use optical, microwave, acoustic, and/or infrared sensors that sense a signal being sent from the user's hand 206. For example, light or infrared transmitters on a glove (not shown) worn on the user's hand 206 can be detected by the motion sensors 316 to determine where the user 204 is moving his hand. Alternatively, acoustic signals can be transmitted from the motion sensors 316 and bounced back to the motion sensors 316. By using the direction of the bounced-back acoustic signals and the time duration between transmitting and receiving the acoustic signals, the augmented reality device 200 is able to determine the 3-D location of the user's hand 206. Similarly, electromagnetic radiation (e.g., infrared light, visible light, radio frequency signals, etc.) can be transmitted from the motion sensors 316 and bounced back to the motion sensors 316. As with the use of acoustic signals, by using the direction of the bounced-back electromagnetic radiation and the time duration between transmitting and receiving the electromagnetic radiation, the augmented reality device 200 is able to determine the 3-D location of the user's hand 206.

In one embodiment of the present invention, the 3-D position of the user's hand 206 is detected by passive infrared (IR) sensors 318. The user's hand 206 generates heat due to normal human physiology. By detecting the strength and direction of IR radiation, the IR sensors 318 provide enough information/data to the microprocessor 314 to determine the 3-D position of the user's hand 206, by comparing the IR sensor readings with known table/charts.

In one embodiment of the present invention, the 3-D position of the user's hand 206 is detected by camera(s) 320. The camera(s) 320 capture a video image of the user's hand 206. By comparing the size of the captured image to a known size of the user's hand 206, the distance from the augmented reality device 200 to the user's hand 206 is determined by the microprocessor 314. The direction of the user's hand 206 relative to the position of the augmented reality device 200 can be determined by other sensors (e.g., 3-D accelerometers 310) within the augmented reality device 200.

FIG. 3 also depicts an input/output (I/O) card 322, which allows the I/O card 322 to exchange data/information with other devices, including computer 202 shown in FIG. 2, electronic devices held by the user 204, etc.

Figure 4:
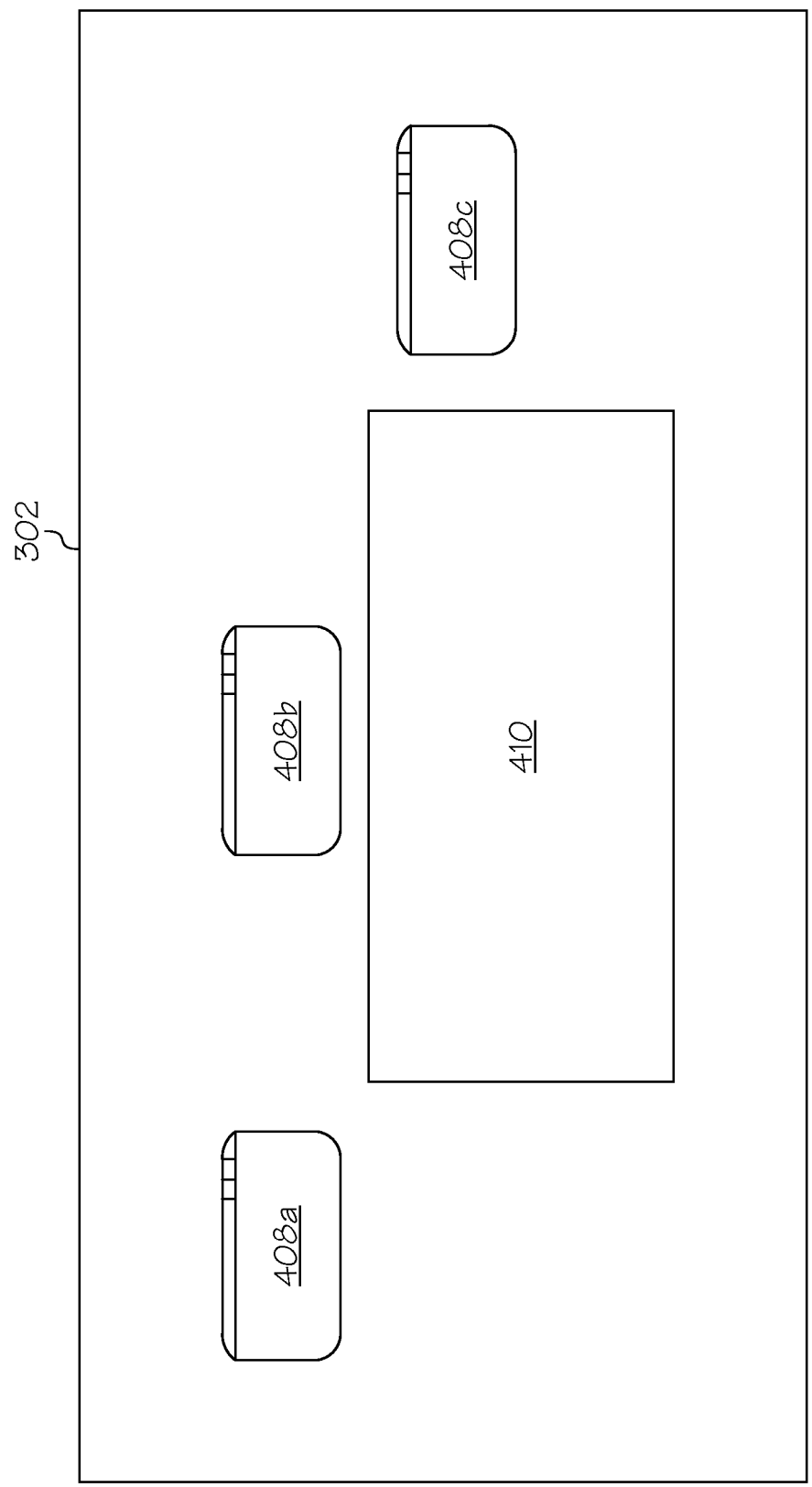
FIG. 4 illustrates an exemplary view of a physical display surrounded by virtual images as seen by a wearer of the augmented reality device shown in FIG. 2.

Referring now to FIG. 4, an exemplary view (as seen by the wearer of the augmented reality device 200 shown in FIG. 2) through a transparent viewing glass 302 is shown. As depicted in FIG. 4, the user/wearer of the augmented reality device 200 sees both real and virtual objects. The real object is the physical display 410 (similar to the physical display 210 shown in FIG. 2). The virtual objects are in the depicted multiple virtual spaces 408a-408c (where "c" is any integer), which are analogous to the virtual space 208 shown in FIG. 2. Each of the virtual spaces 408a-408c is delimited by boundaries generated by the augmented reality device 200. In one or more embodiments of the present invention, each of the virtual spaces 408a-408c is associated with a particular graphic driver (e.g., from graphics drivers 209 in FIG. 2) and/or a particular application (e.g., from applications 244 in FIG. 2). That is, in one embodiment, the overlay projects 304 in FIG. 3 projects images generated by the applications 244 onto the transparent viewing glass 302, thereby creating an appearance of these images within the virtual spaces 408a-408c. In one embodiment, each virtual space from the virtual spaces 408a-408c provides an environment for displaying content from a particular application. In one embodiment, this content is a full version of what the application creates, while in another embodiment the virtual spaces 408a-408c only provide an environment for an icon for the applications.

For example, assume that virtual space 408a is associated with a webpage. In one embodiment, this webpage is visible to a wearer of the augmented reality device 200 (via the transparent viewing glass 302) in a real-time active mode. That is, whatever would appear on a real monitor also appears on the virtual image shown in virtual space 408a. However, in another embodiment, only an icon, snapshot, or other static display for that webpage appears in virtual space 408a.

In either embodiment (whether the dynamic webpage or just an iconic image for the webpage appears in the virtual space 408a), the present invention allows the wearer of the augmented reality device 200 to move the webpage from virtual space (e.g., within virtual space 408a) to real space (e.g., onto the physical display 410). Various actions may be taken by the user (e.g., sweeping his/her hand through virtual space 408a towards the physical display 410) which will cause the webpage to be displayed on the physical display 410. This movement of the display of the webpage from virtual space 408a to the physical display 410 further results in the computer 202 controlling not only the display of the webpage on the physical display 210/410, but also enables the use of a keyboard or other input (e.g., keyboard 118 or mouse 120 shown in FIG. 1) to control/manipulate the webpage and its display.

That is, the present invention allows a user to move a virtual image associated with an application onto a physical display, thereby enabling the user to 1) see the content of the application on the physical display, and 2) have the ability to manipulate the application and its content using hardware associated with the computer that supports the physical display.

Figure 5:
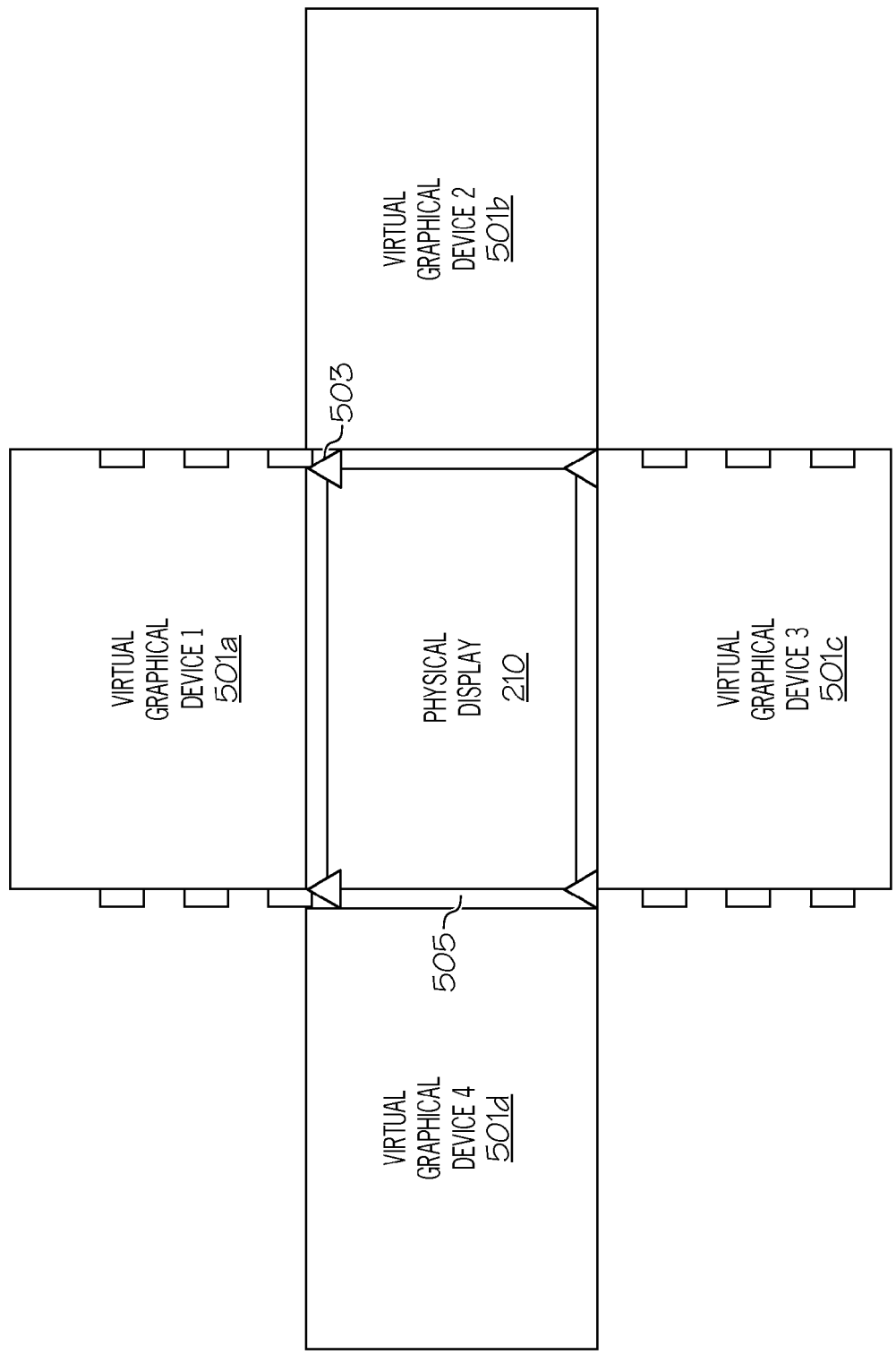
FIG. 5 depicts another exemplary view of a physical display surrounded by virtual images as seen by a wearer of the augmented reality device shown in FIG. 2.

Referring now to FIG. 5, assume that the physical display 210 shown in FIG. 2 is virtually surrounded by four virtual spaces, described as virtual graphical devices 1-4 (virtual graphical devices 501a-501d). Note that each of the virtual graphical devices 501a-501d has a same virtual dimension as the physical display 210 itself. That is, the dimensions of what the wearer of the augmented reality device 200 sees on the transparent viewing glass 302 for each of the virtual graphical devices 501a-501d has been sized to match the dimensions of the physical display 410 seen though the transparent viewing glass 302.

In one embodiment of the present invention, the apparent dimensions of the physical display 210 are derived from physical markers found on the physical display 210. For example, consider marker 503 in FIG. 5, which is one of four markers (shown as triangles) positioned at each of the four corners of the physical display 210. The triangles/markers may be mounted on a physical housing of the physical display 210, or they may be electronically displayed on the screen of the physical display 210. In either embodiment, the camera 320 in FIG. 3 will take a photograph of the physical display 210, including the four triangles/markers. The microprocessor 314 then runs an edge detection algorithm on the captured image to identify the four triangles/markers. The location of the four triangles/markers allows the microprocessor 314 to determine the apparent size of the physical display 210 the user's perspective. Once the size and position of the physical display 210 are ascertained, an augmented reality (AR) marker 505, which surrounds the physical display 210 in virtual reality, denotes the screen position and orientation of the physical display 210 as a base/reference position, from which the virtual graphical devices 501a-501d are positioned.

While the examples shown in FIG. 4 and FIG. 5 assume that the physical display 210 is normal to (i.e., perpendicular to) a line of sight of the wearer of the augmented reality device 200, at times the physical display will be tilted towards or away from the user/wearer, particularly if the physical display 210 is part of a tablet computer or other movable device. In order to compensate for such tilting, the system utilizes a compensation procedure.

Figure 6:
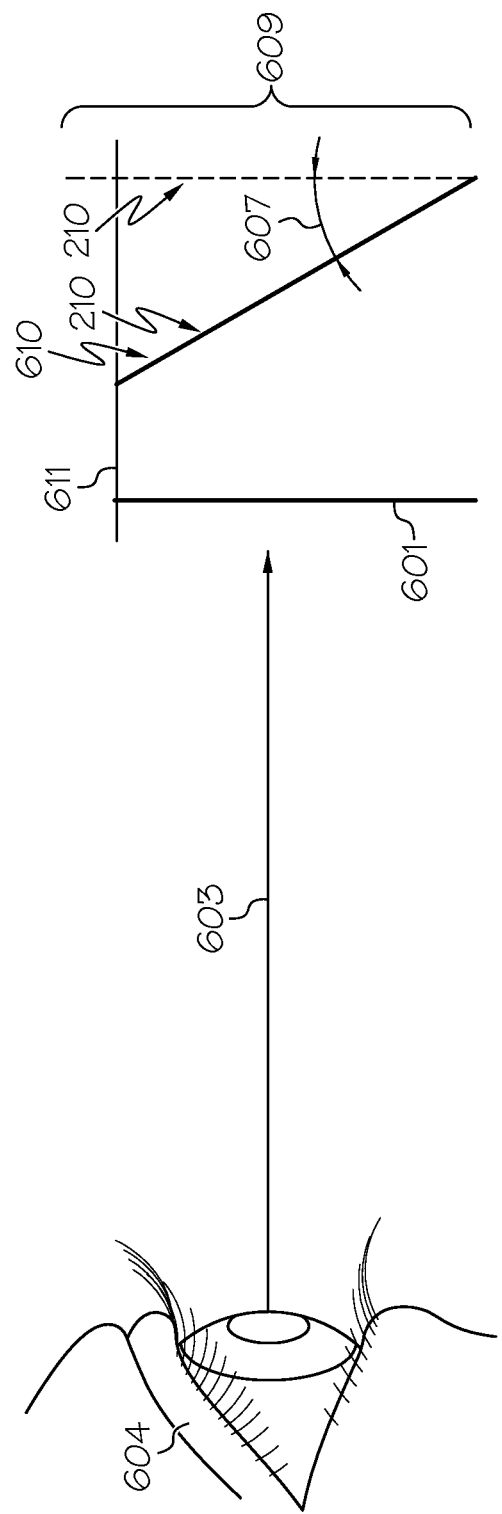
FIG. 6 illustrates a virtual image being adjusted in size to conform with apparent dimensions of a physical display.

Thus, in FIG. 6, assume that a physical display 210 has a height shown by dashed line 609. However, if the physical display 210 is tilted towards the viewer 604, then the viewer 604, looking along line of sight 603, will perceive the physical display 210 as having a height of only that shown by line 601, due to the physical display 210 now being tilted along line 610. (Note that the length of line 610 and the length of line 609 are the same.)

Thus, the perceived differences in height between line 610 and line 609 are merely optical illusions causes by the tilting of the physical display 210.

To calculate the angle of orientation, the law of cosines is used, where:

$$\cos A = \frac{\text{adjacent}}{\text{hypotemise}} = \frac{b}{h}.$$

Thus, the cosine of A (angle 607) is equal to the length of line 609 up to line 611, divided by the length of line 610. The length of the adjacent side is the same as that for line 601, which is measured by a photograph of the tilted physical display 210 taken by the camera 320 in the augmented reality device 200. The length of the hypotenuse is the actual height of the physical display 210, and can be derived by the camera 320 taking a photo of the physical display 210 when perpendicular to the line of sight 603, or it may be provided by an identifier transmitted from the physical display (e.g., a universal unique identifier—UUID), which contains the dimensions of the physical display. This information thus leads to the value of angle A (angle 607), enabling the system to adjust the size of the virtual graphical devices 501a-501d shown in FIG. 5.

Figure 7:
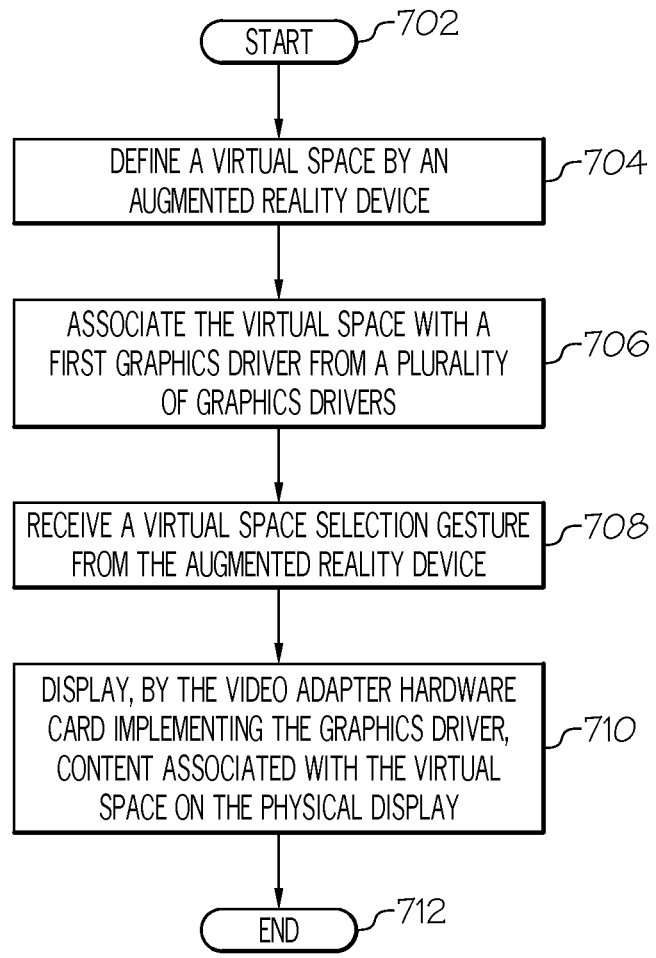
FIG. 7 is a high level flow-chart of one or more operations performed by one or more hardware devices to pair content from a specific area in virtual space with a graphics driver for a physical display.

Referring now to FIG. 7, a high level flow-chart of one or more operations performed by one or more hardware devices to pair content from a specific area in virtual space with a graphics driver for a physical display is presented.

After initiator block 702, an augmented reality device (e.g., augmented reality device 200 in FIG. 2), defines a first virtual space (e.g., virtual space 208 in FIG. 2), as described in block 704. The first virtual space is delimited by a first spatial border (e.g., 3-D spatial border 308 in FIG. 3) that is created by the augmented reality device. The first spatial border is visible only to a user of the augmented reality device, as it is displayed on the transparent viewing glass 302 in FIG. 3. In an alternate embodiment, spatial borders and their associated virtual graphical devices can be transmitted to a second device, such as a second video display, thus allowing multiple persons to see the augmented reality (generated by the overlay projector 304 in FIG. 3) and/or what the user sees from the real physical world (as captured by the camera(s) 320 in FIG. 3).

With reference now to block 706, one or more processors (e.g., microprocessor 314 in FIG. 3 or processor 104 in FIG. 1) then associate the first virtual space with a first graphics driver from a plurality of graphics drivers, wherein the graphics drivers generate images on a physical display. That is, the processors assign a particular virtual space (e.g., virtual space 208) with a particular graphic driver (from graphics drivers 209 in FIG. 2). Thus, each virtual space is specific for a particular application/content and the graphics driver that supports that particular application/content.

With reference now to block 708, a video adapter hardware card (e.g., video adapter 108 in FIG. 1) receives a first signal indicating a first virtual space selection gesture from the augmented reality device. The first signal indicating the first virtual space selection gesture is generated by the augmented reality device in response to the user making a first physical motion that selects the first virtual space, such as moving his/her hand through the first virtual space (i.e., the area in real space that "appears" to be bounded by virtual boundaries to the user).

As described in block 710, in response to the video adapter hardware card receiving the first signal indicating the first virtual space selection gesture, the video adapter hardware card, by implementing the first graphics driver, displays content associated with the first virtual space on the physical display. That is, what earlier was only viewable through the virtual augmented device is not placed on the physical device, such that it can be directly manipulated by the computer that supports that physical device.

The flow-chart ends at terminator block 712.

In an embodiment of the present invention, the first virtual space is from multiple virtual spaces that are defined by the augmented reality device, and the multiple virtual spaces are visible only to the user of the augmented reality device. That is, multiple virtual spaces can be viewable with the use of the augmented reality device (see FIG. 4 and FIG. 5).

In an embodiment of the present invention, real-time content being displayed on the physical display is not displayed on the augmented reality device. That is, in this embodiment, when content is being displayed on the physical display, it no longer is visible in virtual space that is created by the augmented reality device. Rather, the system deletes any virtual space that was previously devoted to the content that is now being displayed on the physical display.

As described herein, in one embodiment of the present invention, the first virtual space selection gesture is a movement of the user through the first virtual space. For example, the user may move his/her hand through the region in space that correlates to the first virtual space being displayed on the augmented reality device. However, in another embodiment, merely aiming the augmented reality device towards a particular virtual space is enough to select the content being presented in that virtual space for display on the physical display. Thus, the user may move his/her head such that the particular virtual space is centered in the transparent viewing glass 302 shown in FIG. 3. By taking some secondary act (such as blinking one's eyes, or simply keeping the augmented reality device in a fixed position for longer than some predetermined amount of time—e.g., three seconds), then the system will select the virtual space and its associated application/driver/content for display on the physical display. Determining where the user is looking and which virtual space is being looked at are achieved by the components of the augmented reality device 200 described herein, particularly in FIG. 3.

In an embodiment of the present invention, one or more processors, using sensor readings from the augmented reality, adjust a dimension of the first virtual space according to a deflection, in real physical space, of the physical display, as described in FIG. 6.

In an embodiment of the present invention, the augmented reality device defines a second virtual space, which is delimited by a second spatial border that is created by the augmented reality device, and where the second spatial border is visible only to the user of the augmented reality device. One or more processors then associate the second virtual space with a second graphics driver from the plurality of graphics drivers. The video adapter hardware card receives a second signal indicating a second virtual space selection gesture from the augmented reality device, where the second signal indicates the second virtual space selection gesture that is generated by the augmented reality device in response to the user making a second physical motion that selects the second virtual space. In response to the video adapter hardware card receiving the second signal indicating the second virtual space selection gesture, the video adapter hardware card replaces the first graphics driver with the second graphic driver, such that content associated with the second virtual space is now on the physical display, and content that was initially associated with the first virtual space and moved to the physical display is now removed from the physical display. That is, a second virtual space can evict content, which was initially associated with a first virtual space, from the physical display.

In an embodiment of the present invention, the hardware graphics card displays multiple positioning icons on the physical display (se marker 503 and the other positioning triangles in FIG. 5). As described in FIG. 5, one or more processors are able to calculate a perceived size of the physical display based on the multiple positioning icons on the physical display. The augmented reality device is then able to adjust a size of the first virtual space to match the perceived size of the physical display.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of pairing content from a specific area in virtual space with a graphics driver for a physical display, the method comprising:
    defining, by an augmented reality device, a first virtual space, wherein the first virtual space is delimited by a first spatial border that is created by the augmented reality device, and wherein the first spatial border is visible only to a user of the augmented reality device;
    associating, by one or more processors, the first virtual space with a first graphics driver from a plurality of graphics drivers, wherein the graphics drivers generate images on a physical display, and wherein the physical display is external to the augmented reality device;
    receiving, by one or more processors, a first signal indicating a selection gesture performed by the user within the first virtual space to select an object within the first virtual space, wherein the selection gesture is performed by the user swiping his/her hand from the object within the first virtual space towards the physical display to cause the object to be displayed on the physical display;
    in response to receiving the first signal indicating the selection gesture performed by the user within the first virtual space to select the object within the first virtual space, implementing, by a video adapter hardware card, the first graphics driver to display the object associated with the first virtual space on the physical display that is external to the augmented reality device, wherein the physical display has a universal unique identifier (UUID) that contains physical dimensions of the physical display;
    receiving, by one or more processors, the UUID from the physical display; and
    adjusting, by one or more processors and based on the physical dimensions described in the UUID received from the physical display, a dimension of the first virtual space according to a deflection, in real physical space, of the physical display, wherein the dimension of the first virtual space perceived by the user of the augmented reality device is adjusted to match actual physical dimensions of the physical display such that a virtual graphical device within the first virtual space has a same set of perceived dimensions as the actual physical dimensions of the physical display.

2. The method of claim 1, wherein the first virtual space is from multiple virtual spaces that are defined by the augmented reality device, and wherein the multiple virtual spaces are visible only to the user of the augmented reality device.

3. The method of claim 2, wherein real-time content being displayed on the physical display is not displayed by the augmented reality device.

4. The method of claim 1, wherein the user of the augmented reality device is a wearer of the augmented reality device.

5. The method of claim 1, wherein the augmented reality device is augmented reality glasses.

6. The method of claim 1, wherein the first virtual space selection gesture is a movement of the user through the first virtual space.

7. The method of claim 1, wherein the first virtual space selection gesture is a user movement that aims the augmented reality device towards the first virtual space.

8. The method of claim 1, wherein the first virtual space selection gesture is the user directing a field of view of the user towards the first virtual space.

9. The method of claim 1, further comprising:
    adjusting, by one or more processors and using sensor readings from the augmented reality device, a dimension of the first virtual space according to a deflection, in real physical space, of the physical display.

10. The method of claim 1, further comprising:
    defining, by the augmented reality device, a second virtual space, wherein the second virtual space is delimited by a second spatial border that is created by the augmented reality device, and wherein the second spatial border is visible only to the user of the augmented reality device;
    associating, by one or more processors, the second virtual space with a second graphics driver from the plurality of graphics drivers;
    receiving, by the video adapter hardware card, a second signal indicating a second virtual space selection gesture from the augmented reality device, wherein the second signal indicating the second virtual space selection gesture is generated by the augmented reality device in response to the user making a second physical motion that selects the second virtual space; and
    in response to the video adapter hardware card receiving the second signal indicating the second virtual space selection gesture, displaying, by the video adapter hardware card replacing the first graphics driver with the second graphic driver, content associated with the second virtual space on the physical display, wherein content associated with the first virtual space is removed from the physical display.

11. The method of claim 1, wherein the first virtual space is two-dimensional.

12. The method of claim 1, wherein the first virtual space is three-dimensional.

13. The method of claim 1, further comprising:
    displaying, by the hardware graphics card, multiple positioning icons on the physical display;
    determining, by one or more processors, a perceived size of the physical display based on the multiple positioning icons on the physical display; and
    adjusting, by the augmented reality device, a size of the first virtual space to match the perceived size of the physical display.

14. The method of claim 1, wherein the content associated with the first virtual space and displayed on the physical display is an application program.

* * * * *